(12) United States Patent
Lee

(10) Patent No.: US 7,988,443 B2
(45) Date of Patent: Aug. 2, 2011

(54) MOLD CLEARING TOOL

(75) Inventor: Hsin-Ho Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 204 days.

(21) Appl. No.: 12/475,573

(22) Filed: May 31, 2009

(65) Prior Publication Data
US 2009/0317508 A1 Dec. 24, 2009

(30) Foreign Application Priority Data
Jun. 24, 2008 (CN) .......................... 2008 1 0302289

(51) Int. Cl.
B29C 33/44 (2006.01)
B29C 45/42 (2006.01)

(52) U.S. Cl. ................ 425/436 RM; 425/190; 425/226; 425/317

(58) Field of Classification Search .................. 425/190, 425/436 R, 226, 472, 436 RM, 806, 225, 425/317; 81/3.25, 3.33, 3.48, 3.49; 29/244, 29/256, 259; 7/154, 165
See application file for complete search history.

(56) References Cited

U.S. PATENT DOCUMENTS

| | | | |
|---|---|---|---|
| 1,057,492 A * | 4/1913 | Munzinger | 408/113 |
| 1,091,301 A * | 3/1914 | Doheny | 81/3.25 |
| 1,518,222 A * | 12/1924 | Sather | 81/3.29 |
| 1,818,626 A * | 8/1931 | Johnston | 81/3.48 |
| 2,060,888 A * | 11/1936 | Newman | 81/3.29 |
| 2,408,450 A * | 10/1946 | Schrader | 81/53.2 |
| 2,505,738 A * | 4/1950 | Howell | 81/3.25 |
| 2,729,124 A * | 1/1956 | Farandatos | 81/3.2 |
| 3,599,311 A * | 8/1971 | Ellis | 29/239 |
| 4,989,312 A * | 2/1991 | Maddalena | 29/259 |
| H1349 H * | 9/1994 | Kelley | 29/259 |
| 5,441,399 A * | 8/1995 | Campbell et al. | 425/556 |
| 5,692,282 A * | 12/1997 | Baca | 29/235 |
| 6,305,061 B1 * | 10/2001 | King | 29/259 |
| 6,978,696 B2 * | 12/2005 | Yu | 81/3.29 |
| 7,520,041 B1 * | 4/2009 | Aguilar | 29/259 |
| 7,685,688 B2 * | 3/2010 | Fan | 29/259 |
| 2003/0037425 A1 * | 2/2003 | Sawaya | 29/426.5 |
| 2008/0152749 A1 * | 6/2008 | Wan | 425/189 |

* cited by examiner

*Primary Examiner* — Yogendra N Gupta
*Assistant Examiner* — Emmanuel S Luk
(74) *Attorney, Agent, or Firm* — Raymond J. Chew

(57) ABSTRACT

A mold clearing tool includes a support portion and a draft portion. The support portion includes a bracket and two poles extending downward from two ends of the bracket. The bracket includes a second through hole defined therein. The draft portion includes a main body and a spiral draft end on one end of the main body. The spiral draft end is threaded outside. The draft portion is movably received through the second through hole for clearing excess material remaining in a molding chamber. The molding chamber includes a plurality of first through holes defined therein.

11 Claims, 6 Drawing Sheets

MOLD CLEARING TOOL

BACKGROUND

1. Technical Field

The present disclosure relates to injection molding, and particularly, to a mold clearing tool.

2. Description of Related Art

In a typical injection molding machine, plastic material is injected into a mold in order to form a molded part. The mold includes a molding chamber for receiving the injected material. When the molded part is complete, the molded part is ejected from the mold. However, when the molded part is ejected, excess material may remain in the molding chamber. Removing the injected material requires unloading the molding chamber from the injection molding machine, and dislodging the injected materials by a tool. The molding chamber is reloaded into the injection molding machine to form another molded part. This process is unduly cumbersome and complicated.

Therefore, a mold clearing tool is desired to overcome the limitations described.

BRIEF DESCRIPTION OF THE DRAWINGS

Many aspects of a mold clearing tool can be better understood with reference to the following drawings. The components in the drawings are not necessarily drawn to scale, the emphasis instead being placed upon clearly illustrating the principles of the present apparatus for assembling a machine tool. Moreover, in the drawings, like reference numerals designate corresponding parts throughout the several views.

DETAILED DESCRIPTION

Figure 1:
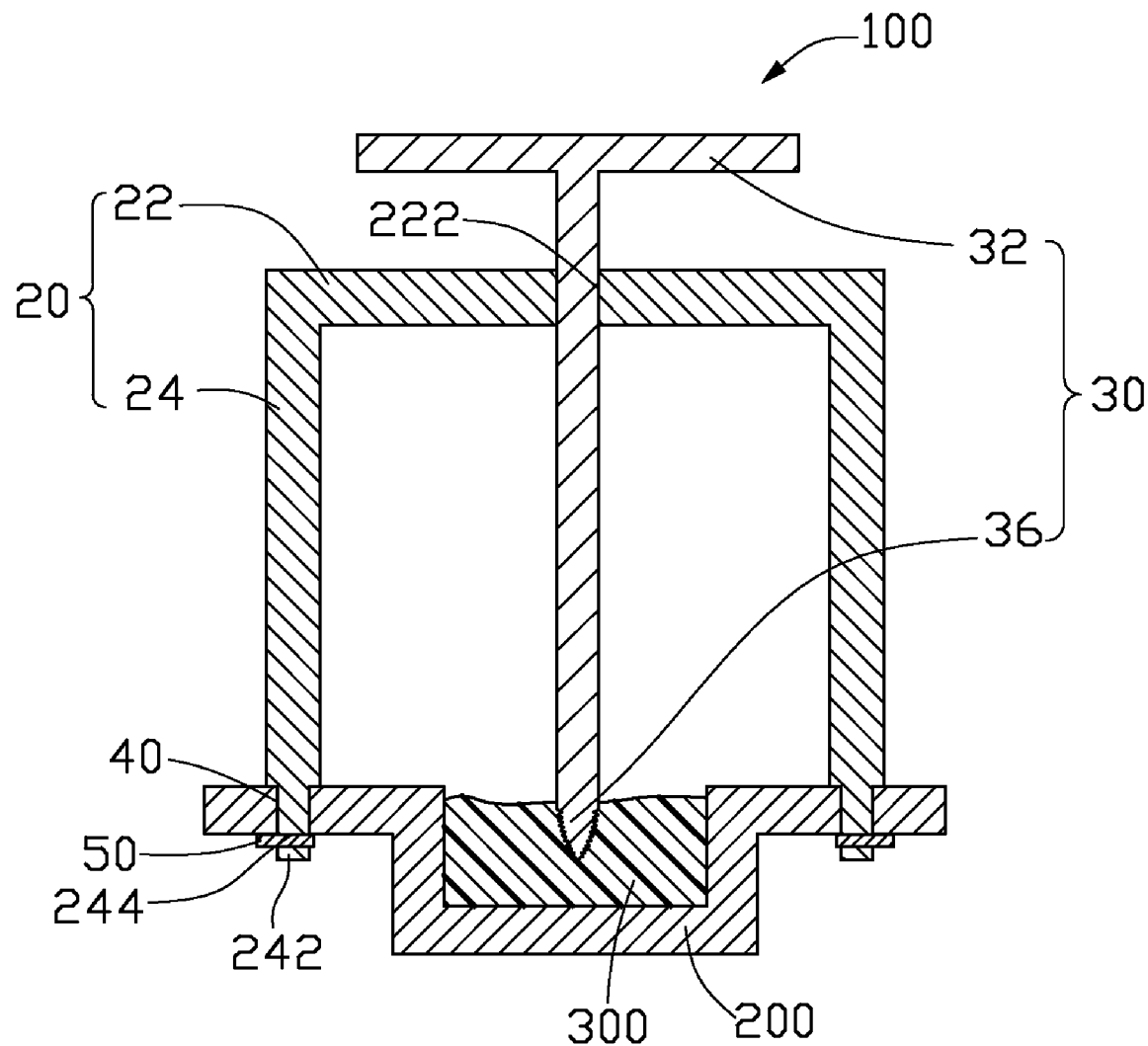
FIG. 1 is a schematic view of a mold clearing tool according to a first embodiment.

Referring to FIG. 1, a mold clearing tool 100 according to a first embodiment includes a support portion 20, and a draft portion 30. The mold clearing tool 100 removes excess material 300 remaining in a molding chamber 200.

The support portion 20 includes a bracket 22, and two poles 24 extending downward from two ends of the bracket 22. The two poles 24 are integrally formed with the bracket 22. Each of the two poles 24 has a fixed end 242. The diameter of the fixed end 242 is less than that of each of the two poles 24. A number of first through holes 40 corresponding to the respective fixed ends 242 are defined in the molding chamber 200. The depth of each of the first through holes 40 is less than the length of the fixed end 242. The fixed end 242 protruding from each of the first through holes 40 defines a fixed hole 244 therein. The mold clearing tool 100 further includes a number of fixed pins 50. The fixed hole 244 cooperates with each of the fixed pins 50 to locate and fix the two poles 24 to the molding chamber 200.

The draft portion 30 includes a main body 32 and a spiral draft end 36 on one end of the main body 32. The main body 32 is T-shaped. The spiral draft end 36 is threaded outside. The bracket 22 defines a second through hole 222 therein. The draft portion 30 is movable through the second through hole 222 of the bracket 22.

Figure 2:
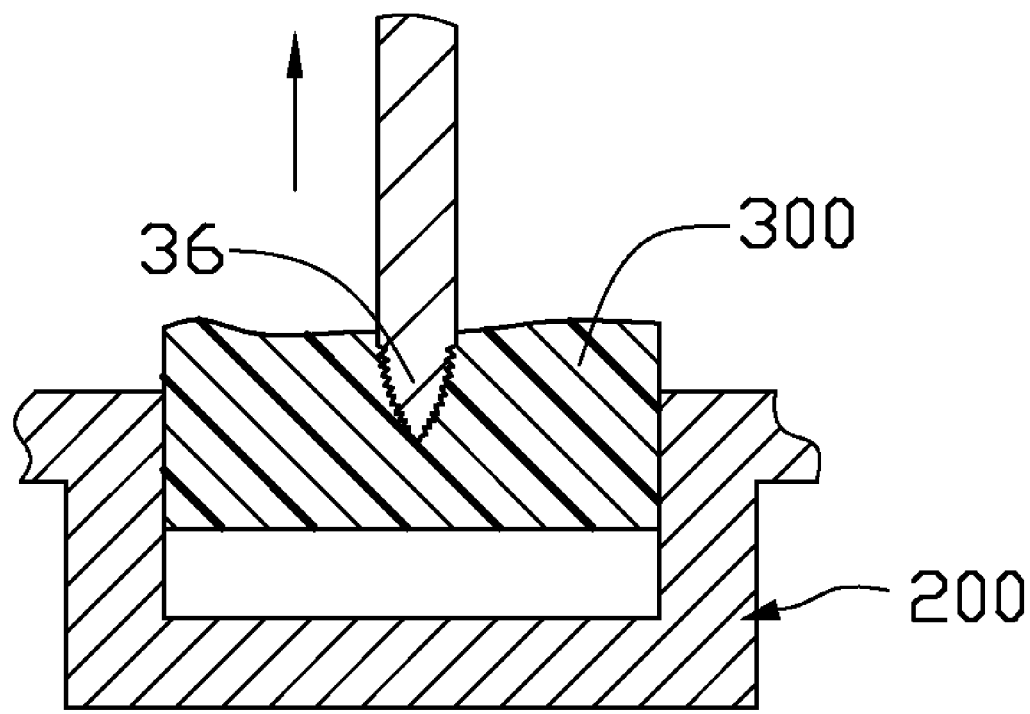
FIG. 2 is a schematic view of the mold clearing tool of FIG. 1 in operation.

Referring to FIGS. 1 and 2, when the excess material 300 blocks the molding chamber 200, the fixed end 242 of each of the two poles 24 is fixed to the molding chamber 200, the spiral draft end 36 of the draft portion 30 engages the excess material 300, which is then withdrawn through the draft portion 30. Thus, the molding chamber 200 does not need to be offloaded from an injection molding machine (not shown).

Figure 3:
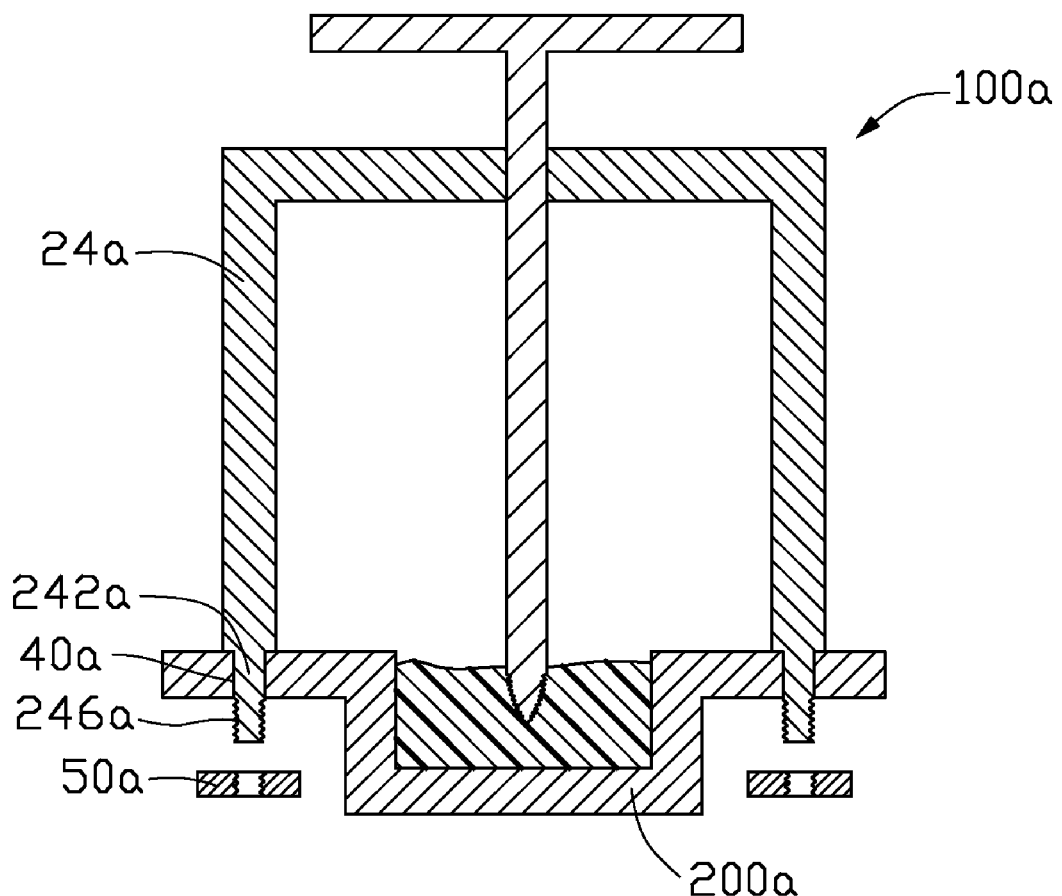
FIG. 3 is a schematic view of a mold clearing tool according to a second embodiment.

FIG. 3 is a schematic view of a mold clearing tool 100a according to a second embodiment, differing from that of FIG. 1 in that a fixed end 242a protruding from each of first through holes 40a has an outer threaded end 246a. The mold clearing tool 100a further includes a number of receiving fasteners 50a. The outer threaded end 246a cooperates with each of the receiving fasteners 50a to locate and fix two poles 24a to a molding chamber 200a.

Figure 4:
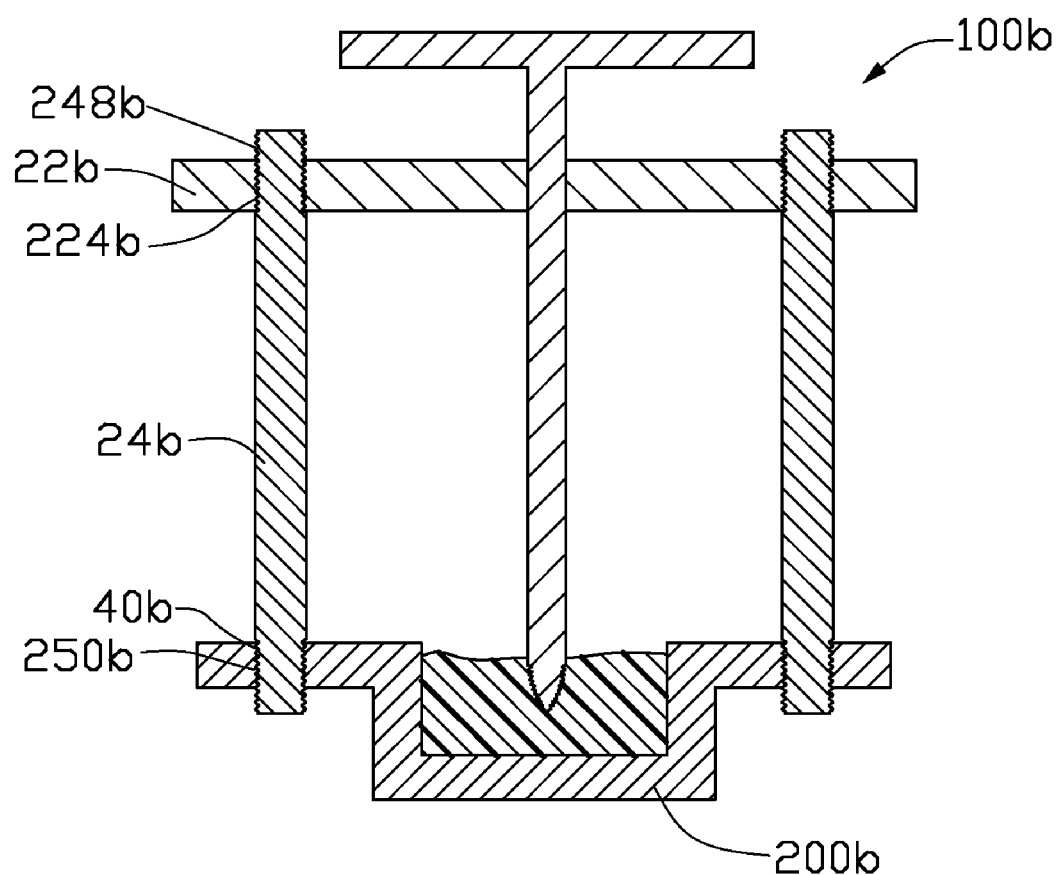
FIG. 4 is a schematic view of a mold clearing tool according to a third embodiment.

FIG. 4 is a schematic view of a mold clearing tool 100b according to a third embodiment, differing from that of FIG. 1 in that a first outer threaded end 248b is on one end of each of two poles 24b, and a second outer threaded end 250b is on another end of each of the two poles 24b. A number of first threaded holes 224b corresponding to the respective the first outer threaded end 248b are defined in a bracket 22b. Each of the first threaded holes 224b cooperates with the first outer threaded end 248b to locate and fix the two poles 24 to the bracket 22b. A number of second threaded holes 40b corresponding to the respective the second outer threaded end 250b are defined in a molding chamber 200b. Each of the second threaded holes 40b cooperates with the second outer threaded end 250b to locate and fix the two poles 24 to the molding chamber 200b.

Figure 5:
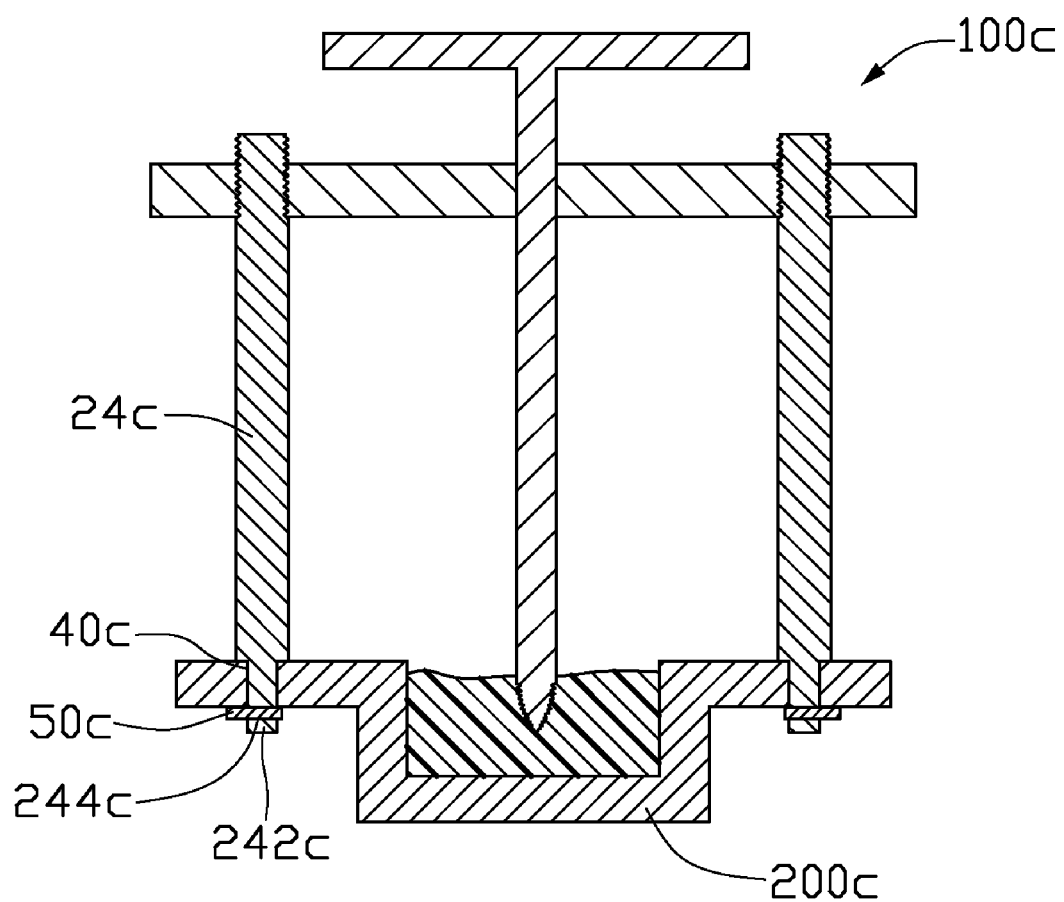
FIG. 5 is a schematic view of a mold clearing tool according to a fourth embodiment.

FIG. 5 is a schematic view of a mold clearing tool 100c according to a fourth embodiment, differing from that of FIG. 4 in that a fixed end 242c is on one end of each of two poles 24c. The diameter of the fixed end 242c is less than the diameter of each of the two poles 24c. A number of first through holes 40c corresponding to the respective fixed end 242c are defined in a molding chamber 200c. The depth of each of the first through holes 40c is less than the length of the fixed end 242c. The fixed end 242c protruding from each of the first through holes 40c defines a fixed hole 244c therein. The mold clearing tool 100c further includes a number of fixed pins 50c. The fixed hole 244c cooperates with each of the fixed pins 50c to locate and fix the two poles 24c to the molding chamber 200c.

Figure 6:
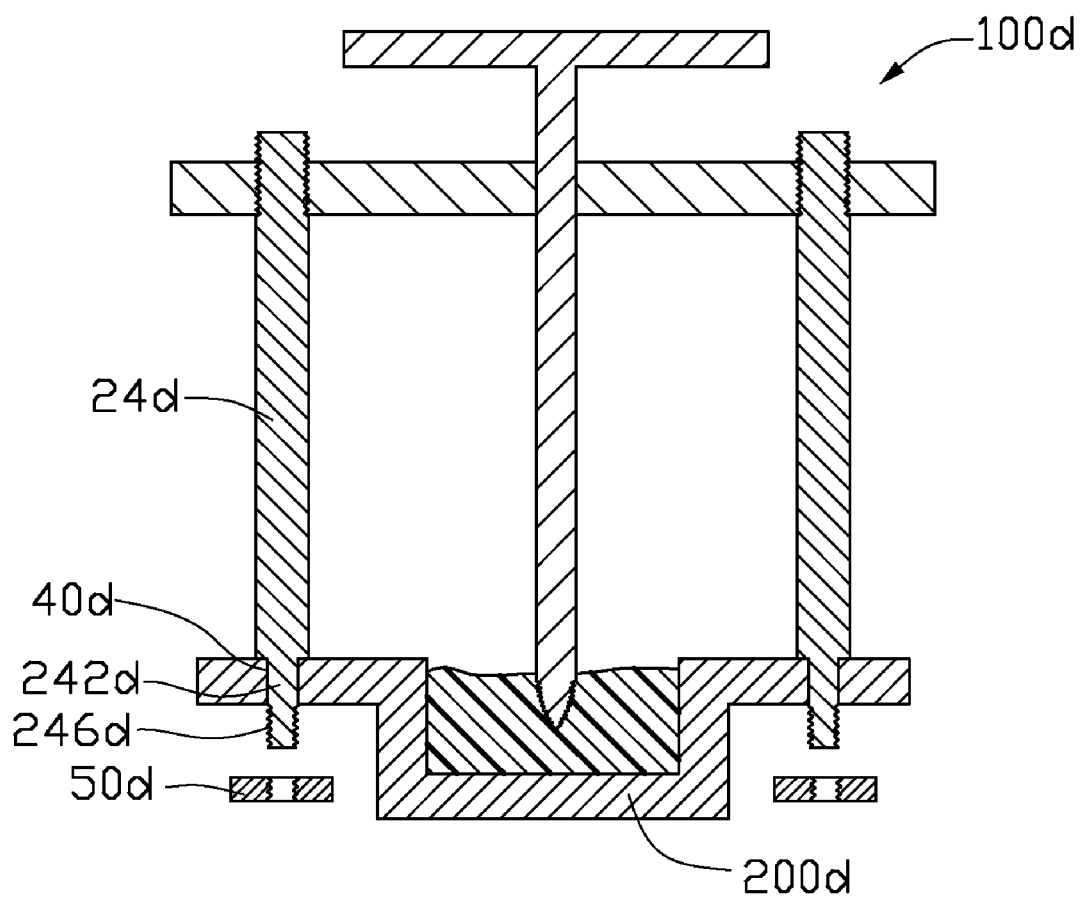
FIG. 6 is a schematic view of a mold clearing tool according to a fifth embodiment.

FIG. 6 is a schematic view of a mold clearing tool 100d according to a fifth embodiment, differing from that of FIG. 5 in that a fixed end 242d protruding from each of first through holes 40d has an outer threaded end 246d. The mold clearing tool 100d further includes a number of receiving fasteners 50d. The outer threaded end 246d cooperates with each of the receiving fasteners 50d to locate and fix two poles 24d to a molding chamber 200d.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mold clearing tool, comprising:
a support portion comprising a bracket and two poles extending downward from two ends of the bracket, wherein the bracket comprises a second through hole defined therein, each of the two poles comprises a fixed end and a fixed hole defined in the fixed end protruding from each of the first through holes; and
a draft portion comprising a main body and a spiral draft end on one end of the main body, wherein the spiral draft end is threaded, and wherein the draft portion is movably received through the second through hole of the bracket to remove excess material remaining in a molding chamber comprising a plurality of first through holes defined therein.

2. The mold clearing tool of claim 1, further comprising a plurality of fixed pins, each engaging the fixed hole.

3. The mold clearing tool of claim 1, wherein the diameter of the fixed end is less than the diameter of each of the two poles.

4. The mold clearing tool of claim 1, wherein each of the two poles comprises a fixed end and an outer threaded end protruding from each of the first through holes.

5. The mold clearing tool of claim 4, further comprising a plurality of receiving fasteners, each engaging the outer threaded end.

6. A mold clearing tool, comprising:
a support portion comprising a bracket and two poles, wherein the bracket comprises a second through hole and a plurality of first threaded holes defined therein, wherein one end of each of two poles comprises a first outer threaded end, the first outer threaded end engaging each of the first threaded holes, another end of each of the two poles comprises a second outer threaded end, wherein the molding chamber comprises a plurality of second threaded holes defined therein, each of the second threaded holes engaging the second outer threaded end; and
a draft portion comprising a main body and a spiral draft end on one end of the main body, wherein the spiral draft end is threaded, and wherein the draft portion is movably received through the second through hole of the bracket to remove excess material remaining in a molding chamber.

7. The mold clearing tool of claim 6, wherein the molding chamber comprises a plurality of first through holes defined therein, and wherein another end of each of the two poles comprises a fixed end and a fixed hole defined in the fixed end protruding from each of the first through holes.

8. The mold clearing tool of claim 7, further comprising a plurality of fixed pins, each of the fixed pins engaging the fixed hole.

9. The mold clearing tool of claim 7, wherein the diameter of the fixed end is less than the diameter of each of the two poles.

10. The mold clearing tool of claim 6, wherein the molding chamber comprises a plurality of first through holes defined therein, wherein another end of each of the two poles comprises a fixed end and an outer threaded end protruding from each of the first through holes.

11. The mold clearing tool of claim 10, further comprising a plurality of receiving fasteners, each of the receiving fasteners engaging the outer threaded end.

* * * * *